(12) United States Patent
Virgil et al.

(10) Patent No.: US 8,560,105 B2
(45) Date of Patent: Oct. 15, 2013

(54) AUTOMATED LOGISTICS SUPPORT SYSTEM INCORPORATING A PRODUCT INTEGRITY ANALYSIS SYSTEM

(75) Inventors: Kenneth W. Virgil, Tucson, AZ (US); Daniel A. Colica, Tuscon, AZ (US); Mark E. Behrens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 363 days.

(21) Appl. No.: 13/087,829

(22) Filed: Apr. 15, 2011

(65) Prior Publication Data

US 2011/0190918 A1  Aug. 4, 2011

Related U.S. Application Data

(63) Continuation-in-part of application No. 11/562,750, filed on Nov. 22, 2006, now Pat. No. 7,930,052.

(51) Int. Cl.
*G06F 19/00* (2011.01)

(52) U.S. Cl.
USPC .................. 700/105; 700/97; 702/34; 702/35

(58) Field of Classification Search
USPC ................................. 700/97, 105; 702/34, 35
See application file for complete search history.

(56) References Cited

U.S. PATENT DOCUMENTS

| | | | |
|---|---|---|---|
| 4,858,146 A | 8/1989 | Shebini | |
| 5,457,792 A | 10/1995 | Virgil et al. | |
| 5,493,679 A | 2/1996 | Virgil et al. | |
| 5,737,532 A | 4/1998 | DeLair et al. | |
| 5,822,218 A * | 10/1998 | Moosa et al. | 716/52 |
| 5,931,877 A | 8/1999 | Smith et al. | |
| 5,950,190 A | 9/1999 | Yeager et al. | |
| 6,110,213 A | 8/2000 | Vinciarelli et al. | |
| 6,405,364 B1 | 6/2002 | Bowman-Amuah | |
| 6,574,537 B2 * | 6/2003 | Kipersztok et al. | 701/31.8 |
| 6,684,349 B2 * | 1/2004 | Gullo et al. | 714/47.2 |
| 7,107,491 B2 * | 9/2006 | Graichen et al. | 714/37 |
| 7,225,981 B2 * | 6/2007 | Jongebloed | 235/385 |
| 7,242,995 B1 | 7/2007 | Morgenson et al. | |
| 7,945,427 B2 * | 5/2011 | Guenther et al. | 702/184 |
| 2005/0154653 A1* | 7/2005 | Jongebloed | 705/28 |
| 2005/0288808 A1 | 12/2005 | Lopez et al. | |
| 2006/0149770 A1 | 7/2006 | Jang et al. | |
| 2009/0265118 A1* | 10/2009 | Guenther et al. | 702/34 |

OTHER PUBLICATIONS

"Failure Reporting, Analysis, and Corrective Action System", Sematech, Copyright 1993. http://www.sematech.org/docubase/document/2332agen.pdf.*

"Probability distribution of machining center failures", Jia Yazhou, Wang Molin, Jia Zhixin—Reliability Engineering & System Safety, vol. 50, Issue 1, 1995, pp. 121-125.*

(Continued)

*Primary Examiner* — Michael D Masinick

(57) ABSTRACT

A computer implemented system includes an integrated logistics support system and a product integrity analysis system that utilize an integrated database. The product integrity analysis system includes a failure mode effects and criticality analysis (FMECA) application that is operable to access a plurality of distribution references, analyze a first and a second distribution reference from the plurality of distribution references, and calculate a particular distribution for a particular part type in the first distribution reference using an associated distribution of the particular part type in the second distribution reference.

20 Claims, 6 Drawing Sheets

(56) References Cited

OTHER PUBLICATIONS

PCT Notification of Transmittal of the International Search Report and the Written Opinion of the International Searching Authority, or the Declaration, mailed Nov. 10, 2008, in re PCT/US07/84509 filed Nov. 13, 2007, 8 pages.

"Reliability and Maintainability Task Priorities," System Reliability Center, 2001 IIT Research Institute, 101 pages, Mar. 14, 2003.

"Reliability/Availability of Electrical and Mechanical Systems of Command, Control, Communications, Computer, Intelligence, Surveillance, and Reconnaissance Facilities," Headquarters of the Army, Mar. 14, 2003, 1 page.

How do I choose: MIL-HDBK-217 or Telcordia SR-332, Printed from http://www.t-cubed.com/faq_choose.htm, 2008, 3 pages.

Australian Government, IP Australia, Examiner's First Report on Patent Application No. 2007323898, Oct. 19, 2011, 2 pages.

* cited by examiner

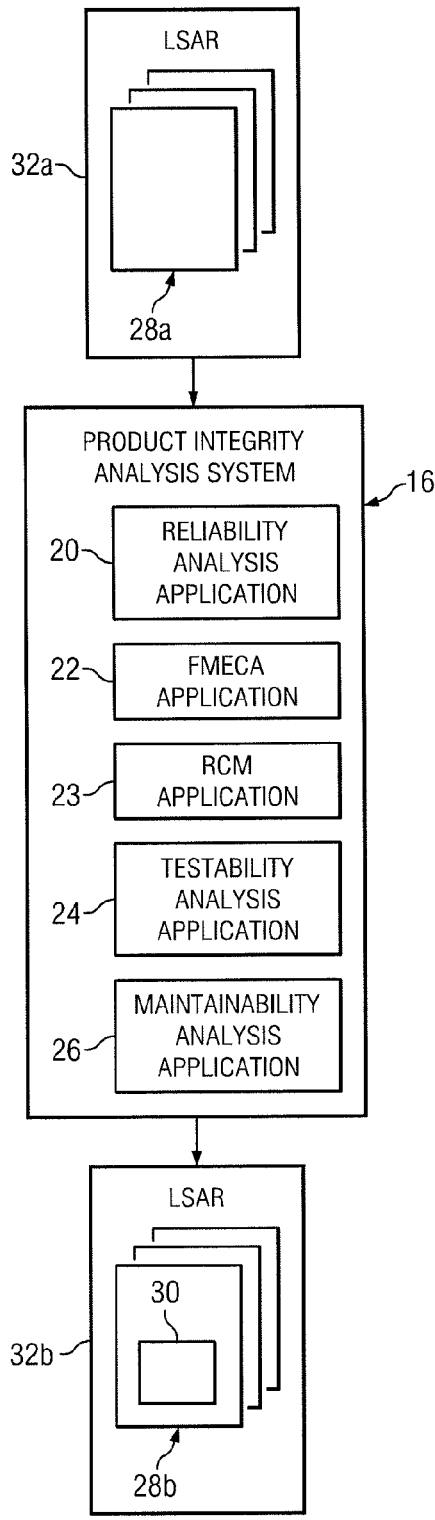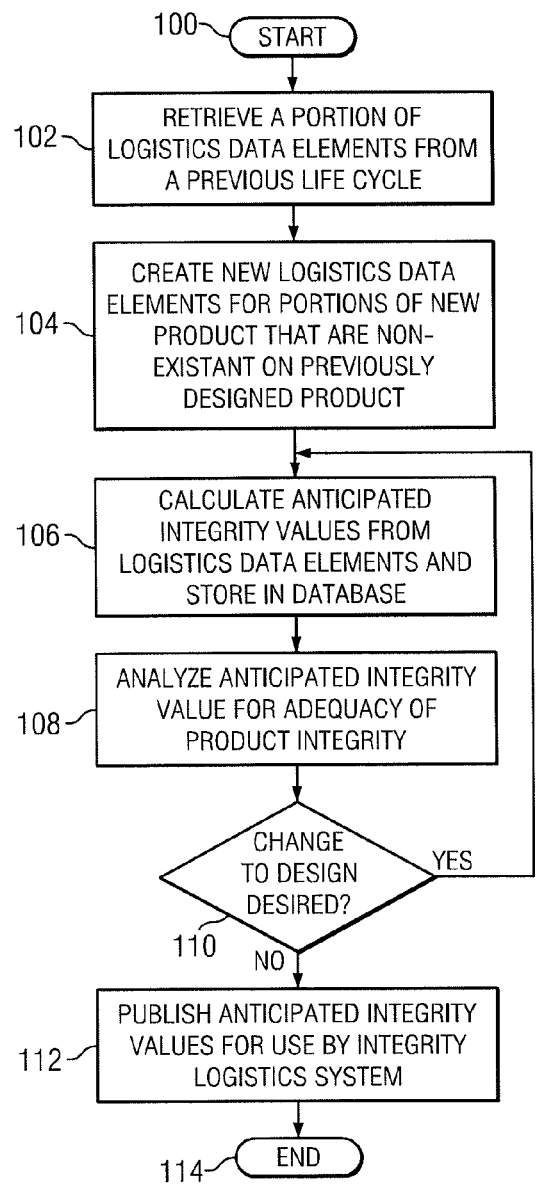

| PART TYPE | PART SUBTYPE | FAILURE MODE | DISTRIBUTION |
|---|---|---|---|
| LAMP | ALL | BULB BROKEN | 35% |
| LAMP | ALL | FILAMENT BURNED OUT | 50% |
| LAMP | ALL | PLUG CORRODED | 15% |

FIG. 5A

| PART TYPE | PART SUBTYPE | FAILURE MODE | DISTRIBUTION |
|---|---|---|---|
| LAMP | INCANDESCENT | BULB BROKEN | 35% |
| LAMP | INCANDESCENT | FILAMENT BURNED OUT | 50% |
| LAMP | INCANDESCENT | PLUG CORRODED | 15% |
| LAMP | HALOGEN | BULB BROKEN | 33% |
| LAMP | HALOGEN | FILAMENT BURNED OUT | 33% |
| LAMP | HALOGEN | PLUG CORRODED | 20% |
| LAMP | HALOGEN | OVERHEATED | 14% |
| LAMP | FLUORESCENT | BULB BROKEN | 75% |
| LAMP | FLUORESCENT | PLUG CORRODED | 15% |
| LAMP | FLUORESCENT | BALLAST FAILURE | 10% |

FIG. 5B

| 502 PART TYPE | 502 PART SUBTYPE | 502 FAILURE MODE | 502 DISTRIBUTION | $c_t$ | 501 PART TYPE | $c_s$ | 501 PART SUBTYPE | $c_m$ | 501 FAILURE MODE | 501 DISTRIBUTION |
|---|---|---|---|---|---|---|---|---|---|---|
| LAMP | INCANDESCENT | BULB BROKEN | 0.35 | 1.000 | LAMP | 0.7500 | ALL | 1.000 | BULB BROKEN | 0.2625 |
| LAMP | INCANDESCENT | FILAMENT BURNED OUT | 0.50 | 1.000 | LAMP | 0.7500 | ALL | 1.000 | FILAMENT BURNED OUT | 0.3750 |
| LAMP | INCANDESCENT | PLUG CORRODED | 0.15 | 1.000 | LAMP | 0.7500 | ALL | 1.000 | PLUG CORRODED | 0.1125 |
| LAMP | HALOGEN | BULB BROKEN | 0.33 | 1.000 | LAMP | 0.1500 | ALL | 1.000 | BULB BROKEN | 0.0495 |
| LAMP | HALOGEN | FILAMENT BURNED OUT | 0.33 | 1.000 | LAMP | 0.1500 | ALL | 1.000 | FILAMENT BURNED OUT | 0.0495 |
| LAMP | HALOGEN | PLUG CORRODED | 0.20 | 1.000 | LAMP | 0.1500 | ALL | 1.000 | PLUG CORRODED | 0.0300 |
| LAMP | HALOGEN | OVERHEATED | 0.14 | 1.000 | LAMP | 0.1500 | ALL | 0.500 | BULB BROKEN | 0.0105 |
| LAMP | HALOGEN | OVERHEATED | 0.14 | 1.000 | LAMP | 0.1500 | ALL | 0.500 | FILAMENT BURNED OUT | 0.0105 |
| LAMP | FLUORESCENT | BULB BROKEN | 0.75 | 1.000 | LAMP | 0.1000 | ALL | 1.000 | BULB BROKEN | 0.0750 |
| LAMP | FLUORESCENT | PLUG CORRODED | 0.15 | 1.000 | LAMP | 0.1000 | ALL | 1.000 | PLUG CORRODED | 0.0150 |
| LAMP | FLUORESCENT | BALLAST FAILURE | 0.10 | 1.000 | LAMP | 0.1000 | ALL | 1.000 | PLUG CORRODED | 0.0100 |

*FIG. 5C*

AUTOMATED LOGISTICS SUPPORT SYSTEM INCORPORATING A PRODUCT INTEGRITY ANALYSIS SYSTEM

RELATED APPLICATIONS

This application is a continuation-in-part of U.S. application Ser. No. 11/562,750 filed Nov. 22, 2006 and entitled "Automated Logistics Support System Incorporating a Product Integrity Analysis System."

TECHNICAL FIELD OF THE INVENTION

This invention generally relates to automated logistics support systems, and more particularly, to an automated logistics support system incorporating a product integrity analysis system and method of operating the same.

BACKGROUND OF THE INVENTION

Integrated logistics support (ILS) is referred to as a process that facilitates the management of a product throughout its life cycle. The concept of integrated logistics support was originally developed by the military sector of the government for the purpose of supporting various combat systems, such as weaponry, or various types of armament throughout their useful lifespan. More recently, however, integrated logistics support systems have been implemented by non-military organizations. The product supported by an integrated logistics support system may be any device or system, such as software, or an electrical, electro-mechanical, or mechanical product that may be designed by one or more development personnel and may be produced by the organization. The life cycle of the product may extend from inception phase to the serviceable life of the product and may include development and production phases. The design of the product may predominantly occur during the development phase of a life cycle. The production phase is entered into upon completion of the development phase and continues throughout the serviceable life of the product.

SUMMARY OF THE INVENTION

According to one embodiment of the invention, a computer implemented system includes an integrated logistics support system and a product integrity analysis system that utilize an integrated database. The product integrity analysis system is operable to retrieve at least a portion of logistics data records from the database, calculate an anticipated integrity value of the product using the portion of logistics data records, and store the anticipated integrity value of the product in the database.

According to another embodiment of the invention, a computer implemented method includes retrieving at least a portion of logistics data records from a database, calculating an anticipated integrity value, and storing the anticipated integrity value in the database. The anticipated integrity value is calculated using the portion of logistics data records. The portion of logistics data records are stored in the database as an integrated logistics support system.

Embodiments of the invention may provide numerous technical advantages. Some, none, or all embodiments may benefit from the below described advantages. According to one embodiment, potential errors resulting from communication between disparate databases may be alleviated. That is, translation of logistics data records and anticipated integrity values between the product integrity analysis system and integrated logistics support system may not be necessary because both utilize a common database according to certain embodiments. The integrated logistics support system incorporates a product integrity analysis system that is adapted to retrieve from and store calculated results in the database of the integrated logistics support system. Because the integrated logistics support system and product integrity analysis system may use a common database, translation of data between these two systems may not be necessary. Additionally, usage of an integrated database may allow users of the integrated logistics support system to immediately view results from the product integrity analysis system.

Other technical advantages will be apparent to one of skill in the art.

BRIEF DESCRIPTION OF THE DRAWINGS

A more complete understanding of embodiments of the invention will be apparent from the detailed description taken in conjunction with the accompanying drawings in which:

FIG. 3 is a block diagram of the product integrity analysis system of the embodiment of FIG. 1;

FIG. 4 is a flowchart showing several actions that may be performed in order to implement the embodiment of FIG. 1;

FIGS. 5A-5C are charts illustrating distribution references utilized by certain embodiments of failure mode effects and criticality analysis application of FIG. 1;

DETAILED DESCRIPTION OF EXAMPLE EMBODIMENTS OF THE INVENTION

Figure 1:
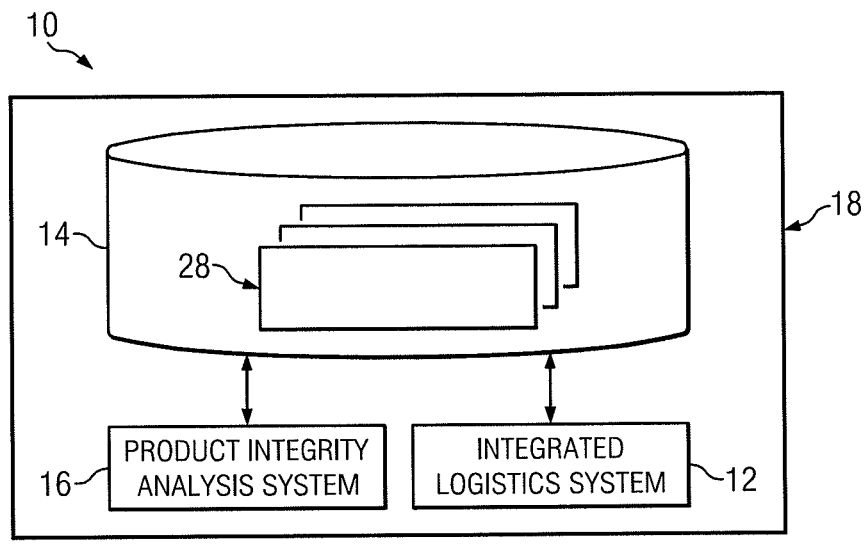
FIG. 1 is a block diagram of one embodiment of an integrated logistics support system incorporating a product integrity analysis system according to one embodiment of the present invention.

Embodiments of the invention are best understood by referring to FIGS. 1 through 4 of the drawings, like numerals being used for like and corresponding parts of the various drawings.

Product integrity analysis systems have been used during the development phase of a product's life cycle in order to identify weaknesses in the design of the product. Once identified, modifications may have been made to the design of the product in order to enhance the general robustness of the product. These product integrity analysis systems may have included applications or tools, such as reliability, maintainability, and/or testability (RMT) applications. These applications were generally mathematical modeling tools that produced anticipated integrity values for various portions of the product. These anticipated integrity values indicated the general robustness of the design of the product due to projected normal as well as abnormal use. Results from product integrity analysis applications have generally enabled development personnel to identify potential weaknesses in the product and make appropriate corrective action to the design of the product.

Development personnel skilled in the use of product integrity analysis systems may be generally referred to as systems engineers. On the other hand, personnel who are skilled in the concepts and use of integrated logistics support systems are generally referred to as logisticians. Logisticians may be primarily concerned with implementation of the product during the production phase of the product's life cycle.

Although the value of product integrity analysis systems has been known, access to results from these systems by skilled logisticians has been somewhat strained using conventional product integrity analysis systems. In some cases, this may have been due to lack of readily available results produced by the product integrity analysis system. This lack of readily available results may be due to several factors. For instance, anticipated integrity values may have been stored in a format that is not readily understood by logisticians. Conventional product integrity analysis systems have historically used databases for storage of results that are generally disparate to the type of databases used to store integrated logistics support system (ILS) information. In order to use resulting information provided by these product integrity analysis systems, results would have to be translated into a format native to the integrated logistics support system. This translation of data, whether manual or automated, usually resulted in inadvertent errors due to the translation process. Logisticians would also have to wait for completion of the translation in order to utilize information from these conventional product integrity analysis systems. If translation was not performed in a timely manner, users of the conventional integrated logistics support system would be further hindered from utilizing this information. Thus, the teachings of the present invention realize that it would be beneficial to provide a product integrity analysis system for an integrated logistics support system that provides anticipated integrity values that are readily understood by users of the integrated logistics support system, such as logisticians, in a timely manner.

FIG. 1 shows one embodiment of an automated logistics support system 10 that may provide a solution to the previously described problems with conventional product integrity analysis systems. The automated logistics support system 10 generally has an integrated logistics support system 12 and a database 14 for storage of logistics data records 28 associated with a life cycle of a product. According to the teachings of the invention, automated logistics support system 10 also has a product integrity analysis system 16 that is coupled to database 14 in order to retrieve logistics data records from the database, perform product integrity calculations on this data, and store results of these calculations in database 14 for use by users of the integrated logistics support system 10. In this manner, results from product integrity analysis system 16 may be immediately available to users of the integrated logistics support system 12 upon generation of these results.

In one embodiment, product integrity analysis system 16 may retrieve logistics data records 28 directly from the database 14. In this manner, logisticians as well as users of the product integrity analysis system 16 may share a common repository for product data. In another embodiment, calculated results from the product integrity analysis system 16 may be stored in database 14 in a format native to the integrated logistics support system 12. Certain embodiments of the present invention may provide an advantage in that potential errors caused through translation of data shared between the two systems 12 and 16 may be alleviated. Additionally, skilled users of the integrated logistics support system may have immediate view of calculated results from product integrity analysis system 16 thereby enabling these users to provide timely feedback during the development process of the product's life cycle.

The automated logistics support system 10 may be implemented on any suitable computer implemented system 18 that may be, for example, a network coupled computing system or a stand-alone computing system. The stand-alone computing system may be any suitable computing system, such as a personal computer, laptop computer, or mainframe computer capable of executing instructions necessary to implement the integrated logistics support system 12 and product integrity analysis system 16 according to the teachings of the present invention. The network computing system may be a number of computers coupled together via a network, such as a local area network (LAN), a metropolitan area network (MAN), or a wide area network (WAN). The automated logistics support system 10 implemented on a network computing system may allow several users, such as skilled users of the product integrity analysis system 16 to readily share results with skilled users of the integrated logistics support system 12.

Figure 2:
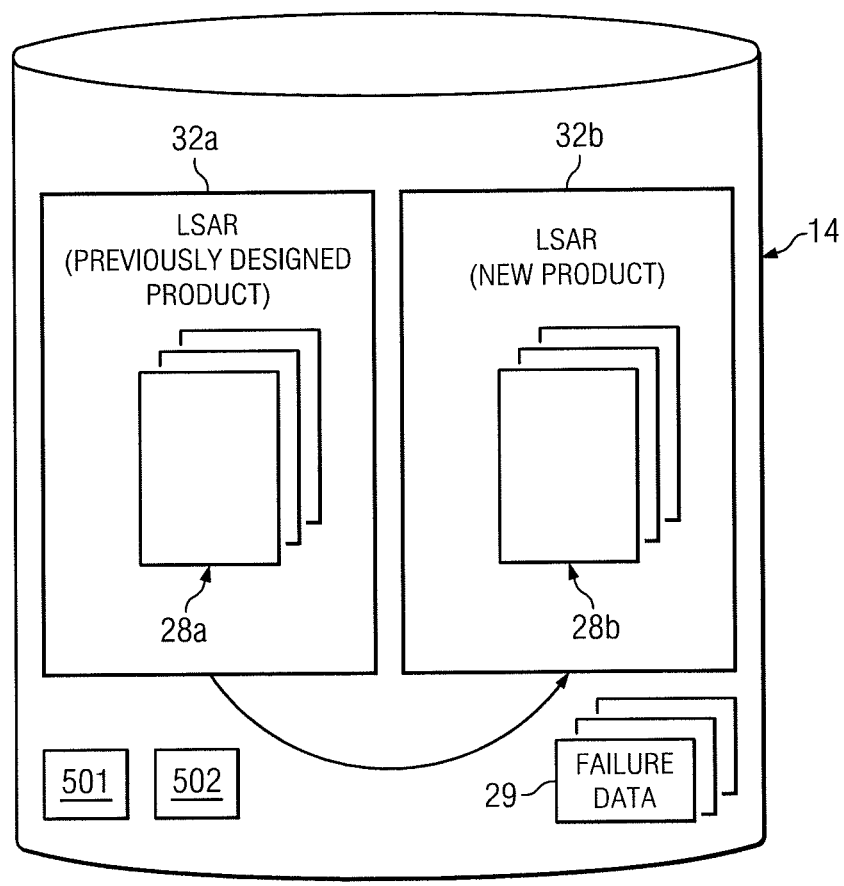
FIG. 2 is a block diagram of several logistics support analysis records that may be stored in the database of the embodiment of FIG. 1.

In one embodiment, integrated logistics support system 12 may be configured to produce logistics support analysis records (LSARs) 32a and 32b that are stored in database 14, as shown in FIG. 2. FIG. 2 is a block diagram of several logistics support analysis records that may be stored in database 14. Logistics support analysis record 32a may include several logistics data records 28a associated with a life cycle of a previously designed product. Logistics support analysis record 32 may exist for each product that is supported by the integrated logistics support system 12. As will be described in greater detail below, a new logistics support analysis record 32b may be created for a new product by copying several logistics data records 28a from logistical analysis data record 32a of a previously designed product. Moreover, these logistics data records 28a may be useful in providing information that may be used by product integrity analysis system 16.

Logistics data records 28a and 28b may be stored in logistics support analysis records 32a and 32b using any suitable industry standard format. In one embodiment, logistics data records 28a and 28b may be stored in the logistics support analysis record 32a and 32b according to a MIL-STD-1388-2B or DEF STAN 00-60 compliant format. MIL-STD-1388-2B and DEF STAN 00-60 compliant formats have been established by the military sector of the government as a means to classify and store product related information. In another embodiment, logistics data records 28a and 28b may be stored in the logistics support analysis record 32a and 32b according to a MIL-PRF-49506 Logistics Management Information (LMI) specification. In another embodiment, logistics data records 28a and 28b may be stored in the logistics support analysis record 32a and 32b according to the United Kingdom's Ministry of Defense (MoD)Defense Standard 00-60 (0060). In another embodiment, logistics data records 28a and 28b may be stored in the logistics support analysis record 32a and 32b according to the Government Electronics and Information Technology Association (GEIA) standard GEIA-STD-0007. This product related information may be used to facilitate logistical implementation of the product throughout it useful life cycle. A particular database compliant with either of the previously described industry standards may have a number of logistics data records 28 that may be logistical support analysis (LSA) data records. Certain embodiments of the present invention may provide an advantage in that a central repository is provided for users of the integrated logistics support system 12 and users of the product integrity analysis system 16 using an industry standard compliant logistics support analysis record 32. In this manner, potential errors to information caused by transferal from one system to another are alleviated. Additionally, results of the various integrity analyses are immediately available to skilled users of the integrated logistics support system 12.

FIG. 3 is a block diagram showing several components of product integrity analysis system 16. The product integrity analysis system 16 has a number of integrity analysis applications that may include a reliability analysis application 20, a failure mode effects and criticality analysis application 22, a reliability centered maintenance (RCM) application 23, a testability analysis application 24, and a maintainability analysis application 26. Logistics support analysis record 32a may have a number of logistics data records 28a that are retrievable by applications (20, 22, 23, 24, or 26). Product integrity analysis system 16 may produce one or more anticipated integrity values 30 that are stored in logistics support analysis record 32b of a new product. In one embodiment, anticipated integrity values 30 may be stored in one or more logistics data records 28b. The logistics data records 28a or 28b may each include information associated with particular portions of the product. For example, one particular logistics data record 28 may include information regarding a certain electronic component on a circuit card assembly that has been implemented on the product. This logistics data record 28 may include information such as product specifications for this electronic component, maximum operating conditions, nominal values, empirical failure rates, and other information that may be pertinent for calculating a resulting anticipated integrity value 30 for this component. Several logistics data records 28 associated with various components of the circuit card assembly may be retrieved by the product integrity analysis system 16 in order to calculate an overall anticipated integrity value 30 for the circuit card assembly. In a similar manner, logistics data records 28a associated with other portions of the product may be retrieved by the product integrity analysis system 16 in order to calculate anticipated integrity values 30 for various portions of the product.

Reliability analysis application 20 may be operable to calculate various anticipated integrity values 30 for the product. Reliability is referred to as the ability of a product to perform its intended function for a specified interval under specified conditions. The reliability analysis application 20 may be operable to calculate one or more anticipated integrity values 30, such as failure rate calculations, reliability modeling calculations, and generate various reports associated with these analyses. In one embodiment, reliability analysis application 20 may be operable to calculate an anticipated integrity analysis 30 on particular elements of the product that may be, for example, one or more failure rate calculations. In another embodiment, these anticipated integrity values 30 may be performed according to MIL-HDBK-217F, RAC Reliability Toolkit, Commercial Practices Edition, and/or Telcordia SR332.

Failure mode effects and criticality analysis application 22 may be operable to calculate various anticipated integrity values 30 including failure modes, failure effects, and criticality aspects of the product. Failure mode effects calculations involve the consequence of the mechanism through which the failure occurs and the consequence of a failure mode and its frequency of occurrences. Failure mode effects and criticality analysis application 22 may be operable to calculate various anticipated integrity values 30, such as failure mode effects and criticality analysis, and generate reports associated with these analyses. As with reliability analysis application 20, failure mode effects and criticality analysis application 22 may be operable to calculate failure mode criticality and item criticality for various elements of the product. Since failure mode effects and criticality analysis may differ from reliability analysis according to the type of delineation of elements that make up the product, the failure mode effects and criticality analysis application 22 may be able to store failure rate data independently of reliability analysis applications 20. For example, reliability analysis application 20 may calculate failure rate data for individual electronic components of a circuit card while failure mode effects and criticality analysis application 22 may include separate failure rates in order to continue the failure mode effects and criticality analysis process independent of the reliability engineering process. Thus, the product integrity analysis system 16 may provide for storage of failure rate values as individual anticipated integrity values 30 or as one derived anticipated integrity value 30 for use by the integrated logistics support system 12.

In some embodiments, failure mode effects and criticality analysis application 22 may be used to identify parts within a system whose reliability may have an impact on the reliability of an overall system. In some embodiments, failure mode effects and criticality analysis application 22 may first identify ways in which a part or an assembly may fail. For example, failures of a part or assembly may be analyzed in order to determine a probability that certain failures will occur and the probability that the failure will cause a failure or failures in a super-indentured (i.e., parent) part. As a result, failure mode effects and criticality analysis application 22 may be used to document how any particular failure within an entire end item or system will affect the ability of the end item or system to carry out its mission.

In certain circumstances, a failure from a particular assembly may be due to a failure in a lower part or assembly. However, at some point the failure may be considered a failure inherent to the particular type of part. For example, if a particular lamp fails, the failure may not be traced to the parts of the lamp (e.g, bulb, filament, plug), but rather the ways or "failure modes" in which the lamp failure would be documented (e.g., "bulb broken," "filament burned out," "plug corroded").

In some embodiments, the frequency in which failures occur may be documented in a distribution reference manual as a percentage of possible failure modes that can occur. In some situations, parts, their corresponding failure modes, and the distribution of the failure modes may be defined one way in a particular failure mode distribution reference but defined a different way in a different failure mode distribution reference. For example, FIGS. 5A-5B illustrate example embodiments of distribution references 501 and 502 that may be utilized by failure mode effects and criticality analysis application 22 to determine anticipated integrity values 30, as described above. In some embodiments, distribution references 501 and 502 may include part types 510, part subtypes 520, failure modes 530, and distributions 540.

For illustrative purposes only, a first distribution reference 501 may include an entry 505 that includes a part type 510a of a "lamp" that has no subtype 520a, or whose subtype 520a is "all" (i.e., the data in distribution reference 501 is intended to be applied to all types of lamps). Each entry in distribution reference 501 includes an associated failure mode 530a, such as "bulb broken," "filament burned out," and "plug corroded," to indicate how the "lamp" failed. In addition, each entry in distribution reference 501 includes a numerical percentage for distribution 540a to indicate the statistical probability or historical likelihood of the particular part type 510a failing in the manner of failure mode 530a. For example, distribution

540a for entry 505 indicates that there is a 35% chance of a "lamp" having a failure mode of "bulb broken." In certain embodiments, distribution 540a may be expressed as a percentage or as a decimal value and may total 100% or 1.00 for a particular part type 510a.

In contrast, a second distribution reference 502, as illustrated in FIG. 5B, may also have a part type 510b of a "lamp," but may have additional part subtypes 520b such as "incandescent," "halogen," and "fluorescent" that are not included in distribution reference 501. Additionally, as illustrated in entry 506, part subtype 520b labeled "halogen lamp" may have additional failure modes 530b such as "overheated" that are not found in distribution reference 501. Likewise, as illustrated in entry 507, "fluorescent lamp" may have an additional failure mode 530b such as "ballast failure" which is not included in distribution reference 501, but may not have the failure mode "filament burned out" which is found in distribution reference 501.

In certain situations, a sub-indentured (i.e., child) part may have been initially evaluated according to a first distribution reference, but later must be reevaluated according to a different distribution reference. For example, a sub-indentured part that was initially evaluated using distribution reference 501 may need to be reevaluated using distribution reference 502 in order to be compatible with a parent part and in order to facilitate the automatic "rolling up" of failure mode distributions to the parent part and all ancestors. To facilitate the compatibility of distribution references such as distribution references 501 and 502 that may have different part subtypes 520, failure modes 530, and distributions 540, failure mode effects and criticality analysis application 22 may translate data between distribution references. For example, FIG. 5C illustrates an example of a third distribution reference 503 that may be determined by failure mode effects and criticality analysis application 22 from distribution references 501 and 502. In addition to items 510-540 described above, distribution reference 503 includes first conversion factors 550, second conversion factors 560, third conversion factors 570, and calculated distributions 580. As described in more detail below, distributions 580 are translations of distributions 540b that allow distribution reference 501 to be compatible with distribution reference 502.

As illustrated in FIGS. 5A and 5B, distribution reference 502 includes failure modes 530b that are not included in distribution reference 501. Moreover, any failure modes 530 having a natural translation (e.g. those present in both distribution reference 501 and distribution reference 502) will have different distributions from each other due to the effects of including the distributions 540b from distribution reference 502. To alleviate this problem, failure mode effects and criticality analysis application 22 may translate the part type 510, part subtype 520, failure mode 530, and/or distribution 540 from one reference to another. In the illustrated examples, the part types 510a and 510b match, the subtypes 520a and 520b do not match, the failure modes 530a and 530b do not match, and the distributions 540a and 540b do not match. Accordingly, failure mode effects and criticality analysis application 22 may categorize the non-matching data from distribution reference 502 into an appropriate data category in distribution reference 501, and then account for this reassignment in the failure mode distribution 540, as explained in more detail below.

In order to accurately reassign part type 510, part subtype 520, and failure mode 530 from distribution reference 502 to distribution reference 501, failure mode effects and criticality analysis application 22 may utilize three conversion factors: $c_t$ 550 corresponding to part type 510, $c_s$ 560 corresponding to part subtype 520, and $c_m$ 570 corresponding to failure mode 530. Conversion factors 550-570 allow a part type 510b, a subtype 520b, or failure mode 530b present in distribution reference 502 to be assigned to multiple non-matching part types 510a, subtypes 520a, or failure modes 530a present in distribution reference 501. For situations where part type 510, subtype 520, or failure mode 530 is present in both distribution references 501 and 502, a conversion factor such as 1.0 may be used. In other situations, other appropriate conversion factors 550-570 may be utilized. Conversion factors 550-570 are discussed in more detail below.

After conversion factors 550-570 are determined, calculated distributions 580 may be calculated according to the equation below:

$$\text{distribution } 580 = (c_t \, 550 * c_s \, 560 * c_m \, 570) * \text{distribution } 540b$$

To calculate conversion factor 550-570, a statistical analysis may be utilized to determine how frequently a part type 510b of distribution reference 502 appears as a part type 510a of distribution reference 501. As an example for illustrative purposes, "Lamp" in distribution reference 502 always appears as "Lamp" in distribution reference 501. Therefore, the conversion factor $c_t$ 550 is 100% or 1.0. As another example, suppose distribution reference 501 instead had "Clear Lamps" and "Tinted Lamps" as the only choices for part type 510a. A part count method may then be utilized to conclude, for example, that 60% of the "Lamps" in the project are clear, where the other 40% are tinted. In the conversion from "Lamp" to "Clear Lamp," a conversion factor $c_t$ 550 of 0.60 may be appropriate, and in the conversion from "Lamp" to "Tinted Lamp," a conversion factor $c_t$ 550 of 0.40 may be appropriate.

In some embodiments, failure mode effects and criticality analysis application 22 may alternatively/additionally translate between distribution references that do not contain the same part subtypes 520. For example, as illustrated in FIGS. 5A and 5B, the part subtypes 520b of "incandescent", "halogen", and "fluorescent" of distribution reference 502 are not present in distribution reference 501. In this situation, a $c_s$ 560 may be determined for each part subtype 520 based on, for example, a percentage that each part subtype 520 occurs in the project. For example, if is determined that 75% of the lamps in the project are incandescent, 15% are halogen, and 10% are fluorescent, $c_s$ 560 corresponding to a part type 510b of "Lamp" and a part subtype 520b of "incandescent" would be 0.75, $c_s$ 560 corresponding to a part type 510b of "Lamp" and a part subtype 520b of "halogen" would be 0.15, and $c_s$ 560 corresponding to a part type 510b of "Lamp" and a part subtype 520b of "fluorescent" would be 0.10. In some embodiments, another statistical analysis could also be utilized to determine $c_s$. For example, sales figures reported by a particular manufacturer or industry group could be utilized to determine the appropriate percentages and $c_s$ for each part subtype 520b.

In some embodiments, failure mode effects and criticality analysis application 22 may alternatively/additionally translate between distribution references that do not contain the same failure modes 530. For example, as illustrated in FIGS. 5A and 5B, the failure modes 530b of "overheated" or "ballast failure" of distribution reference 502 are not present in distribution reference 501. In this situation, a $c_m$ 560 may be determined for each part subtype 520 based on, for example, a statistical and/or functional analysis. For example, if a failed ballast is considered to be equivalent in a certain application to be equivalent to a corroded plug, a $c_m$ 560 of 1.0 may be used for corresponding failure modes 530a and 530b. If, for an overheated halogen lamp, it is determined that 50% of overheated halogen lamps result in a burned out filament, and 50% of the overheated lamps actually fracture the glass that forms the lamp, a $c_m$ 560 of 0.50 may be used for corresponding failure modes 530a and 530b.

Once distribution reference 503 is determined as described above, failure mode distributions present in distribution reference 502 may be represented in a format compatible with distribution reference 501. As a result, failure mode effects and criticality analysis application 22 may calculate a failure mode distribution for a parent part regardless of whether the failure modes and distributions of the sub-indentured parts have been defined according to a different distribution reference. In addition, cross references can be established one way or both ways between distribution reference 501 and distribution reference 502, and cross references can be formed for any arbitrary failure mode distribution references. As a result, full automatic calculation between any two parts whose failure mode distributions come from any two disparate failure mode references may be provided.

Figure 6:
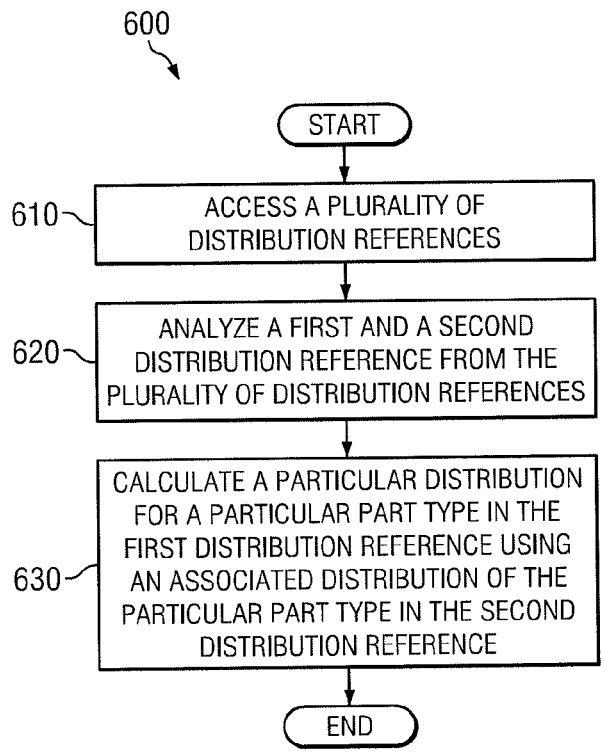
FIG. 6 illustrates a method of a failure mode effects and criticality analysis application, according to certain embodiments.

FIG. 6 illustrates one embodiment of a method 600 of failure mode effects and criticality analysis application 22. Method 600 may be implemented, for example, by one or more computer systems and may be embodied in a non-transitory, computer-readable medium. Method 600 begins in step 610 where a plurality of distribution references are accessed. In some embodiments, each distribution reference includes a plurality of part types, a plurality of part subtypes, a plurality of failure modes, and a plurality of distributions indicating how often a particular one of the failure modes occurs for each part type and part subtype.

In step 620, a first and a second distribution reference from the plurality of distribution references of step 610 are analyzed. In some embodiments, the first and second distribution references are analyzed to determine conversion factors, as described above. In some embodiments, the first and second distribution references are analyzed to categorize non-matching data from the second distribution reference into an appropriate data category in the first distribution reference, as described above.

In step 630, a particular distribution for a particular part type in the first distribution reference is calculated using an associated distribution of the particular part type in the second distribution reference. In some embodiments, the particular distribution is calculated using the conversion factors determined in step 620 and as described above. In some embodiments, the particular distribution is calculated by multiplying the conversion factors of step 620 with the associated distribution of the particular part type in the second distribution reference. After step 630, method 600 ends.

Reliability centered maintenance application 23 may be operable to calculate various integrity values 30 including maintenance requirements, resource utilization, and the identification of engineering deficiencies. Reliability Centered Maintenance is generally a type of disciplined logic or methodology used to identify one or more preventive maintenance tasks. These preventative maintenance tasks may serve to realize the inherent reliability of equipment using the least expenditure of resources in some embodiments. Reliability centered maintenance application 23 may be operable to calculate various anticipated integrity values 30, such as applicability and effectivity of servicing tasks, on-condition tasks, hard time tasks, failure finding tasks, combination tasks, redesign, and generate reports associated with these analyses. In one embodiment, reliability centered maintenance application 23 may be operable to calculate effectivity of servicing tasks for various elements of the product. In another embodiment, these anticipated integrity values 30 may be performed according to industry standards and specifications such as MIL-HDBK-2173(AS), ATA MSG-3, NAVAIR 00-25-403, and/or MIL-STD-1843.

Testability analysis application 24 may be operable to calculate various testability aspects of the product. Testability is a design characteristic that allows the operational status of the product to be determined and isolation of faults within the product to be performed in a timely manner. Testability analysis application 24 may be operable to calculate various anticipated integrity values 30, such as detection group values, built-in-test procedures for failure modes, identification of parts that a failure mode can be isolated to, and testability failure rates.

Maintainability analysis application 26 may be operable to calculate various maintainability aspects of the product. Maintainability is generally regarded as the ability of an item to be retained in or restored to a specified condition when maintenance is performed by personnel having specified skill levels, using prescribed procedures and resources, at each prescribed level of maintenance and repair. In one embodiment, maintainability analysis application 26 provides capabilities to define various scenarios and perform analyses using industry standards and specifications, such as those described in Procedure 2 or Procedure 5 of MIL-STD-472. Maintainability analysis application 26 may be operable to calculate various anticipated integrity values 30, such as availability, mean man hours of usage, mean time to repair, and mean maximum maintenance time for both corrective and preventative maintenance. Additionally, maintainability analysis application 26 may generate reports associated with these analyses. In another embodiment, anticipated integrity analyses may be corrective maintenance or preventative maintenance procedures as specified by industry standards and specifications, such as those described in paragraphs 1.4.2 and 1.4.3 respectively in MIL-HDBK-472.

FIG. 4 shows a flowchart depicting a series of actions that may be performed by the integrated logistics support system 10 to implement various aspects and features of the present invention. In act 100, the integrated logistics support system 10 is initiated. The integrated logistics support system 10 may be initialized by launching integrated logistics support system 12 and/or product integrity analysis system 16 on computing system 10. In act 102, a number of logistics data records 28a may be retrieved from a logistics support analysis record 32a of a previous life cycle. These logistics data records 28a may include various types of information gathered during the life cycle of a previously designed product. In one embodiment, another logistics support analysis record 32b may be created for a new product design. This new product design, however, may re-use several design components from a previously designed product. Usage of information from elements common to both the previously designed product and the new product enables a relatively more accurate estimation arrived at in a shorter period of time than would otherwise have been achieved if no information had been imported from a previous life cycle. In this manner, a relatively fast and accurate estimation of anticipated integrity may be provided by using information from past performance of these various re-used elements. In act 104, new logistics data records 28b may be created for various elements of the new life cycle that are not common to the previously designed product. These logistics data records 28b may be associated with elements of the new product not common to the previously designed product. Thus, by implementation of acts 102 and 104, a logistics support analysis record 32b may be generated for the new product. Empirical information accumulated through the life cycle of a previously designed product that may be stored in logistics data records 28a may aid in deriving a relatively accurate estimation of the anticipated integrity of the new design. In one embodiment, this empirical information may be obtained from logistics support analysis record 28a.

In act 106, applications 20, 22, 23, 24, and 26 may be executed in order to calculate one or more anticipated integrity values 30 for the product in the development phase of its life cycle. These anticipated integrity values 30 may be stored as logistics data records 28b in logistics support analysis record 32b. In act 108, the anticipated integrity values 30 may be analyzed for adequacy of product integrity. That is, the anticipated integrity values 30 may be compared with one or more prescribed design goals. Users skilled in the usage of product integrity analysis systems 16 may utilize this information to ensure the anticipated integrity of the product. Logisticians may also use these anticipated integrity values 30 to verify that the product may adequately perform its intended function throughout its life cycle. Thus in act 110, users skilled in the usage of product integrity analysis systems 16 as well as users skilled in the usage of integrated logistics support systems 12 may provide feedback to the design process during the development phase of the product. If desired, either of these users may request one or more changes to the design of the product. If changes to the design of the product are made, acts 106 and 108 may again be performed using information associated with these design changes to verify the one or more prescribed design goals. Thus, acts 106, 108, and 110 may be performed any number of times in order to iteratively enhance the anticipated integrity of the product.

Once the anticipated integrity values 30 are acceptable, the logistics support analysis record 32b for the new product and their associated anticipated integrity values 30 may be published for use by the integrated logistics support system 12 in the production stage of the product's life cycle in act 112. Throughout the production phase of the product's life cycle, empirical data obtained through use of product may be recorded in logistics support analysis record 32b to provide enhanced accuracy for future calculations of anticipated integrity values 30 of future product designs. In act 114, the integrated logistics support system 10 may be terminated by stopping the integrated logistics support system 12 and/or product integrity analysis system 16. The one or more logistics data records 28 may remain persistent in database 14 and thus future initiations of integrated logistics support system as described with reference to act 100 may enable usage of logistics data records 28 according to the above described procedure.

Figure 7:
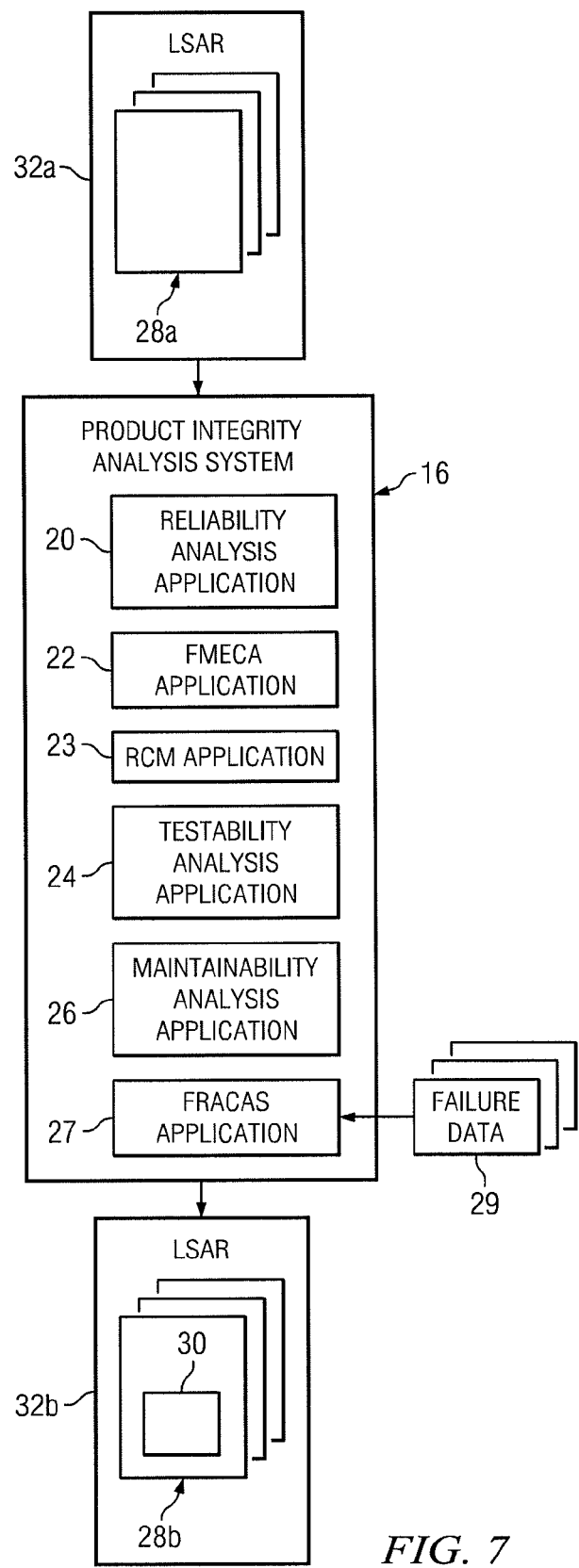
FIG. 7 is a block diagram of another embodiment of a product integrity analysis system that includes a failure reporting and corrective action system application.

FIG. 7 illustrates an embodiment of product integrity analysis system 16 that includes a failure reporting and corrective action system ("FRACAS") application 27. FRACAS application 27 may be used to empirically analyze the reliability of fielded hardware, and may be desirable over a predictive reliability analysis due to the collection of reliability data specific to the item subject to the analysis. When a part fails, FRACAS application 27 may be used to record the failure, as well as other information specific to the failure incident such as the part's age, fielded location, and the like. Over time, accumulated failure data in FRACAS application 27 may be analyzed to pinpoint critical failure modes or common failure modes that were overlooked in a predictive analysis and thus may influence the failure mode effects and criticality analysis, maintainability, and testability components in the design of a new revision of components. Furthermore, the quantity and quality of data in FRACAS application 27 can further be used to bridge the gap between system engineers and logisticians, since the data in FRACAS application 27 may prompt in-service engineering changes on a relatively small scale that can yield relatively large reliability payoffs. Such minor iterations in the product life cycle, i.e., iterations occurring more frequently than a full revision of an entire system, add to the efficacy of a logistics support analysis record 32 incorporating a product integrity analysis system 16.

In some embodiments, FRACAS application 27 may include data elements not present in, or not necessary to, perform predictive reliability techniques. Thus, the accumulation of FRACAS records in a repository such as a database leads to a richness of data not generally available in predictive reliability techniques. This data can be mined in creative ways to determine reliability factors that are not part of standard predictive reliability methods such as those found in industry standards. In some embodiments, for example, the empirical failure rates included in logistics data records 28 as described above may be supplemented and/or replaced by empirical field values determined by FRACAS application 27, as explained in more detail below.

In operation, FRACAS application 27 may first collect and/or access failure data. For example, failures and faults of parts that occur during appropriate inspections and tests may be recorded by a field technician in product integrity analysis system 16 and subsequently stored as failure data 29. In some embodiments, for example, failure data 29 may be stored in database 14, or any other storage medium accessible to FRACAS application 27. For illustrative purposes only, certain embodiments of failure data 29 may include one or more of the following: defective part identification, field failure information, corrective maintenance information, repair part information, vendor part information, defect cause information, root cause information, trend analysis, and the like.

FRACAS application 27 may next access failure data 29 and perform a failure analysis for a particular part. For example, FRACAS application 27 may perform an empirical analysis of failure data 29 in order to determine an actual cause of failure for the particular part. In contrast to other predictive applications of product integrity analysis system 16, FRACAS application 27 utilizes an empirical analysis of stored failure data 29 to evaluate parts. This allows FRACAS application 27 to supply empirically determined field values for a part to applications such as applications 20, 22, 23, 24, and 26. Thus, any anticipated integrity values 30 based on a predictive analysis by applications 20, 22, 23, 24, and 26 may be overridden by superior empirical field values determined by FRACAS application 27. As a result, a more accurate picture of a product's integrity may be obtained.

As described above, FRACAS application 27 may analyze failure data 29 in order to supply applications 20, 22, 23, 24, and 26 with empirical field values (i.e., integrity data) for a particular part. For example, FRACAS application 27 may analyze failure data 29 for a particular part in order to determine one or more failure modes for the part. As an illustration, FRACAS application 27 may analyze failure data 29 for a lamp and determine that the lamp has failed in the field by "losing contact" and "intermittently flickering." FRACAS application 27 may then transmit these failure modes to failure mode effects and criticality analysis application where they may be used to determine anticipated integrity values 30 as described above in reference to failure mode effects and criticality analysis application 22. As a result, any predictive failure modes determined by failure mode effects and criticality analysis application 22 may be overridden and/or supplemented by empirical failure modes determined by FRACAS application 27.

As another example, FRACAS application 27 may analyze failure data 29 for a particular part in order to determine a failure rate of the part. For example, FRACAS application 27 may determine the failure rate for the part based on data in failure data 29 indicating how many hours the part was used before it failed. FRACAS application 27 may then transmit the determined failure rate to reliability analysis application 20 where it may be used to determine anticipated integrity values 30 as described above in reference to reliability analysis application 20. As such, any predictive failure rates determined by reliability analysis application 20 may be overridden and/or supplemented by empirical failure rates determined by FRACAS application 27.

FRACAS application 27 may additionally analyze failure data 29 for a particular part in order to determine a preventive maintenance task of the part. For example, FRACAS application 27 may determine from failure data 29 that a particular maintenance task must be performed on the part in order to prevent a failure. FRACAS application 27 may then transmit the preventive maintenance task to RCM application 23 where it may be used to determine anticipated integrity values 30 as described above in reference to RCM application 23. As such, any predictive preventive maintenance tasks determined by RCM application 23 may be overridden and/or supplemented by empirical preventive maintenance tasks determined by FRACAS application 27.

FRACAS application 27 may additionally analyze failure data 29 for a particular part in order to determine testability aspects of the part. For example, certain embodiments of FRACAS application 27 may determine from failure data 29 the testability aspects described above in reference to testability analysis application 24. As an example of testability aspects for illustrative purposes only, consider a situation where an inordinate number of parts are recorded as failing a particular built-in test. Such a situation may be an indicator that the built-in test has too large an ambiguity group. For example, for early generations of automobiles, a check-engine light would indicate to the technician that the engine is malfunctioning. The isolation group would then consist of all the engine parts (a large number). Subsequent generations of automobiles, however, might allow a technician to query an engine computer in order to receive a code indicating the malfunction is present in a particular engine system (e.g., fuel intake, air intake, combustion, exhaust, etc.). This increased visibility may allow the technician to focus on a subset of the parts of the engine, a much smaller isolation group than the earlier generations of automobiles that merely indicated the engine was malfunctioning. Taking the example further, a modern automobile may allow a technician to query the engine computer to retrieve a code indicating a specific part in the engine has failed. As a result, the technician is able to isolate the specific piece part which needs to be repaired or replaced. This represents an isolation group size of one, which is highly desirable.

After analyzing failure data 29, FRACAS application 27 may transmit testability data to testability analysis application 24 where it may be used to determine anticipated integrity values 30. As such, any predictive testability aspects determined by testability analysis application 24 may be overridden and/or supplemented by empirical testability data determined by FRACAS application 27.

FRACAS application 27 may additionally analyze failure data 29 for a particular part in order to determine maintainability aspects of the part. For example, FRACAS application 27 may determine from failure data 29 the maintainability aspects described above in reference to maintainability analysis application 26. As an example of maintainability aspects for illustrative purposes only, consider the impact of determining that a particular maintenance interval is insufficient to prevent predicted failures for which the maintenance task is expected to address. For example, suppose that if one utilizes an automobile in dusty conditions, one must replace the air cleaner approximately twice as often as one who drives in clear conditions. A record in failure data 29 of an inordinate number of engine failures traced to a clogged air cleaner element would indicate in this case that the air cleaner element would require more frequent replacement. As another example, a record in failure data 29 may be analyzed by FRACAS application 27 to determine the frequency of unplanned corrective maintenance. This analysis by FRACAS application 27 may be used to impact anticipated integrity values 30 calculated by maintainability analysis application 26.

After analyzing failure data 29, FRACAS application may then transmit the maintainability data to maintainability analysis application 26 where it may be used to determine anticipated integrity values 30. As such, any predictive maintainability aspects determined by maintainability analysis application 26 may be overridden and/or supplemented by empirical maintainability data determined by FRACAS application 27.

In some embodiments, FRACAS application 27 may be utilized to perform failure verification. For example, reported failures in failure data 29 may be verified as actual, or an explanation may be provided for failures lacking verification. In some embodiments, failure verification may be determined by repeating the failure mode on the reported item. In other embodiments, failure verification may be determined by evidence of failure such as, for example, leakage residue, damaged hardware, built-in-test (BIT) indication, and the like. And in some embodiments, FRACAS application 27 may be utilized to develop, document, and implement a corrective action to eliminate or reduce the recurrence of the failure.

Figure 8:
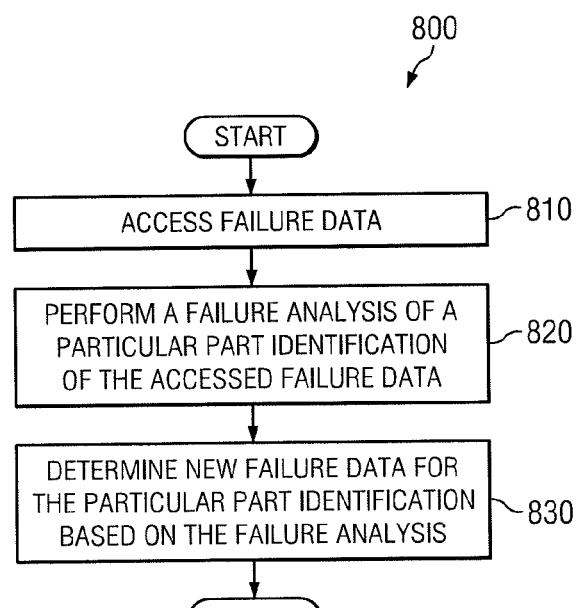
FIG. 8 illustrates a method of a failure reporting and corrective action system application, according to certain embodiments.

FIG. 8 illustrates one embodiment of a method 800 of FRACAS application 27. Method 800 may be implemented, for example, by one or more computer systems and may be embodied in a non-transitory, computer-readable medium. Method 800 begins in step 810 where failure data is accessed. In some embodiments, the failure data accessed in step 810 may refer to failure data 29 described above. In some embodiments, the failure data of step 810 includes a plurality of part identifications, one or more field failure indications for each of the plurality of part identification, and one or more indications of corrective maintenance indications for each of the field failure indications.

In step 820, a failure analysis of a particular part identification of the accessed failure data is performed. In some embodiments, step 820 includes utilizing an empirical analysis of failure data to evaluate parts, as described above. In some embodiments, the analysis of step 820 includes analyzing failure data that was recorded by a user of a FRACAS application, such as FRACAS application 27 described above.

In step 830, new failure data for the particular part identification is determined based on the failure analysis of step 820. In some embodiments, the new failure data of step 830 may refer to empirical data supplied to applications 20, 22, 23, 24, and 26, as described above. In some embodiments, the empirical data of step 830 may be utilized by applications 20, 22, 23, 24, and 26 to determine anticipated integrity values 30, as described above. After step 830, method 800 ends.

Thus, an integrated logistics support 10 has been described that incorporates a product integrity analysis system 16 using database 14 for storage of anticipated integrity values 30.

Using this configuration, logistics data records 28 created by product integrity analysis system 16 are stored in a format native to the integrated logistics support system 12 and are thus immediately viewable by skilled users of the integrated logistics support system 12. Skilled users of the integrated logistics support system 12 such as logisticians may therefore be able to provide meaningful feedback to the life cycle of a product during its development phase.

Although several embodiments have been illustrated and described in detail, it will be recognized that substitutions and alterations are possible without departing from the spirit and scope of the present invention, as defined by the following claims.

What is claimed is:

1. A computer implemented system comprising:
   an integrated logistics support system having a database for storage of a first plurality of logistics data records associated with a previously designed product, the first plurality of logistics data records being stored in a first logistical support analysis record;
   a product integrity analysis system that is coupled to the integrated logistics support system, the product integrity analysis system comprising a failure mode effects and criticality analysis (FMECA) application, the FMECA application operable to:
      access a plurality of distribution references, each distribution reference comprising:
         a plurality of part types;
         a plurality of part subtypes;
         a plurality of failure modes; and
         a plurality of distributions indicating how often a particular one of the failure modes occurs for each part type and part subtype;
      analyze a first and a second distribution reference from the plurality of distribution references; and
      calculate a particular distribution for a particular part type in the first distribution reference using an associated distribution of the particular part type in the second distribution reference;
   wherein the product integrity analysis system is operable to create a new plurality of logistics data records for a new product, the new plurality of logistics data records being associated with one or more elements of the new product not common to the previously designed product.

2. The computer implemented system of claim 1, the product integrity analysis system further operable to:
   retrieve at least a portion of the first plurality of logistics data records from the database;
   calculate an anticipated integrity value of the product using the portion of the first plurality of logistics data records and the calculated distribution for the particular part type;
   create a second logistical support analysis record comprising the calculated anticipated integrity value; and
   store the second logistical support analysis record in the database.

3. The computer implemented system of claim 1, wherein the first and new logistical support analysis records are compliant with a standard selected from the group consisting of MIL-STD-1388-2B, MIL-PRF-49506, United Kingdom Ministry of Defense Standard 00-60 (0060), and Government Electronics and Information Technology Association standard GEIA-STD-0007.

4. The computer implemented system of claim 1, wherein calculating a particular distribution for a particular part type in the first distribution reference using an associated distribution of the particular part type in the second distribution reference comprises:
   determining a plurality of conversion factors associated with the first and second distribution references; and
   calculating the particular distribution for the particular part type in the first distribution by multiplying the determined conversion factors with the associated distribution of the particular part type in the second distribution reference.

5. The computer implemented system of claim 4, wherein the plurality of conversion factors comprise:
   a first conversion factor associated with the plurality of part types of the first and second distribution references;
   a second conversion factor associated with the plurality of part subtypes of the first and second distribution references; and
   a third conversion factor associated with the plurality of failure modes of the first and second distribution references.

6. The computer implemented system of claim 1, wherein the database is a relational database.

7. The computer implemented system of claim 1, wherein the integrated logistics support system and the product integrity analysis system are each operable to utilize the plurality of logistics support analysis records without translating the plurality of logistics support analysis records.

8. A computer implemented method comprising:
   accessing a plurality of distribution references, each distribution reference comprising:
      a plurality of part types;
      a plurality of part subtypes;
      a plurality of failure modes; and
      a plurality of distributions indicating how often a particular one of the failure modes occurs for each part type and part subtype;
   analyzing a first and a second distribution reference from the plurality of distribution references; and
   calculating a particular distribution for a particular part type in the first distribution reference using an associated distribution of the particular part type in the second distribution reference.

9. The computer implemented method of claim 8 further comprising:
   retrieving at least a portion of a first plurality of logistics data records from a database;
   calculating an anticipated integrity value of a previously designed product using the retrieved portion of the first plurality of logistics data records and the calculated distribution for the particular part type;
   creating a logistical support analysis record for a new product, the logistical support analysis record comprising the calculated anticipated integrity value; and
   storing the created logistical support analysis record for the new product in the database.

10. The computer implemented method of claim 9, wherein the logistical support analysis record is compliant with a standard selected from the group consisting of MIL-STD-1388-2B, MIL-PRF-49506, United Kingdom Ministry of Defense Standard 00-60 (0060), and Government Electronics and Information Technology Association standard GEIA-STD-0007.

11. The computer implemented method of claim 8, wherein calculating a particular distribution for a particular part type in the first distribution reference using an associated distribution of the particular part type in the second distribution reference comprises:

determining a plurality of conversion factors associated with the first and second distribution references; and calculating the particular distribution for the particular part type in the first distribution by multiplying the determined conversion factors with the associated distribution of the particular part type in the second distribution reference.

12. The computer implemented method of claim 11, wherein the plurality of conversion factors comprise:

a first conversion factor associated with the plurality of part types of the first and second distribution references;

a second conversion factor associated with the plurality of part subtypes of the first and second distribution references; and a third conversion factor associated with the plurality of failure modes of the first and second distribution references.

13. The computer implemented method of claim 9, wherein the database is a relational database.

14. A computer implemented system comprising:

an integrated logistics support system having a database for storage of a first plurality of logistics data records associated with a previously designed product, the first plurality of logistics data records being stored in a first logistical support analysis record;

a product integrity analysis system that is coupled to the integrated logistics support system, the product integrity analysis system comprising a failure reporting and corrective action system (FRACAS) application, the FRACAS application operable to:

access failure data comprising:

a plurality of part identifications;

one or more field failure indications for each of the plurality of part identification; and one or more indications of corrective maintenance indications for each of the field failure indications;

perform a failure analysis of a particular part identification of the accessed failure data; and determine new failure data for the particular part identification based on the failure analysis;

wherein the product integrity analysis system is operable to create a new plurality of logistics data records for a new product, the new plurality of logistics data records being associated with one or more elements of the new product not common to the previously designed product.

15. The computer implemented system of claim 14, the product integrity analysis system further operable to:

retrieve at least a portion of the first plurality of logistics data records from the database;

calculate an anticipated integrity value of the product using the portion of the first plurality of logistics data records and the determined new failure data for the particular part identification;

create a second logistical support analysis record comprising the calculated anticipated integrity value; and store the second logistical support analysis record in the database.

16. The computer implemented system of claim 14, wherein the first and new logistical support analysis records are compliant with a standard selected from the group consisting of MIL-STD-1388-2B, MIL-PRF-49506, United Kingdom Ministry of Defense Standard 00-60 (0060), and Government Electronics and Information Technology Association standard GEIA-STD-0007.

17. The computer implemented system of claim 14, wherein performing a failure analysis of a particular part identification of the accessed failure data comprises utilizing an empirical analysis of the accessed failure data.

18. The computer implemented system of claim 14, wherein the new failure data comprises one or more failure modes associated with the particular part identification.

19. The computer implemented system of claim 14, wherein the new failure data comprises integrity data associated with the particular part identification.

20. The computer implemented system of claim 14, wherein the new failure data comprises a failure rate of a part identified by the particular part identification.

* * * * *